United States Patent [19]

Stiff

[11] 4,409,911
[45] Oct. 18, 1983

[54] LISTING AND BED SHAPING APPARATUS WITH PLANTER ATTACHMENT AND METHOD

[75] Inventor: Alonzo B. Stiff, Brawley, Calif.

[73] Assignee: Jordan Implemenet Co., Brawley, Calif.

[21] Appl. No.: 314,133

[22] Filed: Oct. 23, 1981

[51] Int. Cl.³ .............................................. A01C 5/06
[52] U.S. Cl. ...................................... 111/52; 111/85; 172/701; 172/448; 172/635
[58] Field of Search ................. 172/448, 635, 72, 701, 172/140, 155, 176, 776, 451; 111/52, 73, 85, 60, 61, 83, 59, 80, 63, 62

[56] References Cited

U.S. PATENT DOCUMENTS

| | | | |
|---|---|---|---|
| 3,187,822 | 6/1965 | Clifford | 172/701 |
| 3,235,013 | 2/1966 | Kirkpatrick | 172/635 X |
| 3,252,522 | 5/1966 | Taylor | 172/701 X |
| 3,456,607 | 7/1969 | West | 172/701 |
| 3,538,987 | 11/1970 | Taylor | 172/701 |
| 3,661,213 | 5/1972 | Taylor | 172/72 |
| 3,701,327 | 10/1972 | Krumholz | 111/85 |
| 3,744,441 | 7/1973 | Smith | 111/85 |
| 4,336,844 | 6/1982 | Helbig | 172/448 |

*Primary Examiner*—Richard J. Johnson
*Attorney, Agent, or Firm*—Flehr, Hohbach, Test, Albritton & Herbert

[57] ABSTRACT

A combination listing and bed shaping apparatus for use with a self-propelled vehicle having a three-point hitch. A tool bar assembly is provided which is secured to the three-point hitch so that tool bar assembly extends in a generally horizontal direction perpendicular to the path of travel of the self-propelled vehicle. Listing apparatus is carried by said tool bar assembly for forming furrows and raised beds. An additional tool bar is secured to the tool bar assembly permitting pivotal movement of said additional tool bar along about an axis parallel to the tool bar assembly. Bed shaping apparatus is carried by additional tool bar. An actuator is connected between the tool bar assembly and the additional tool bar for raising and lowering said additional tool bar with respect to said tool bar means.

6 Claims, 6 Drawing Figures

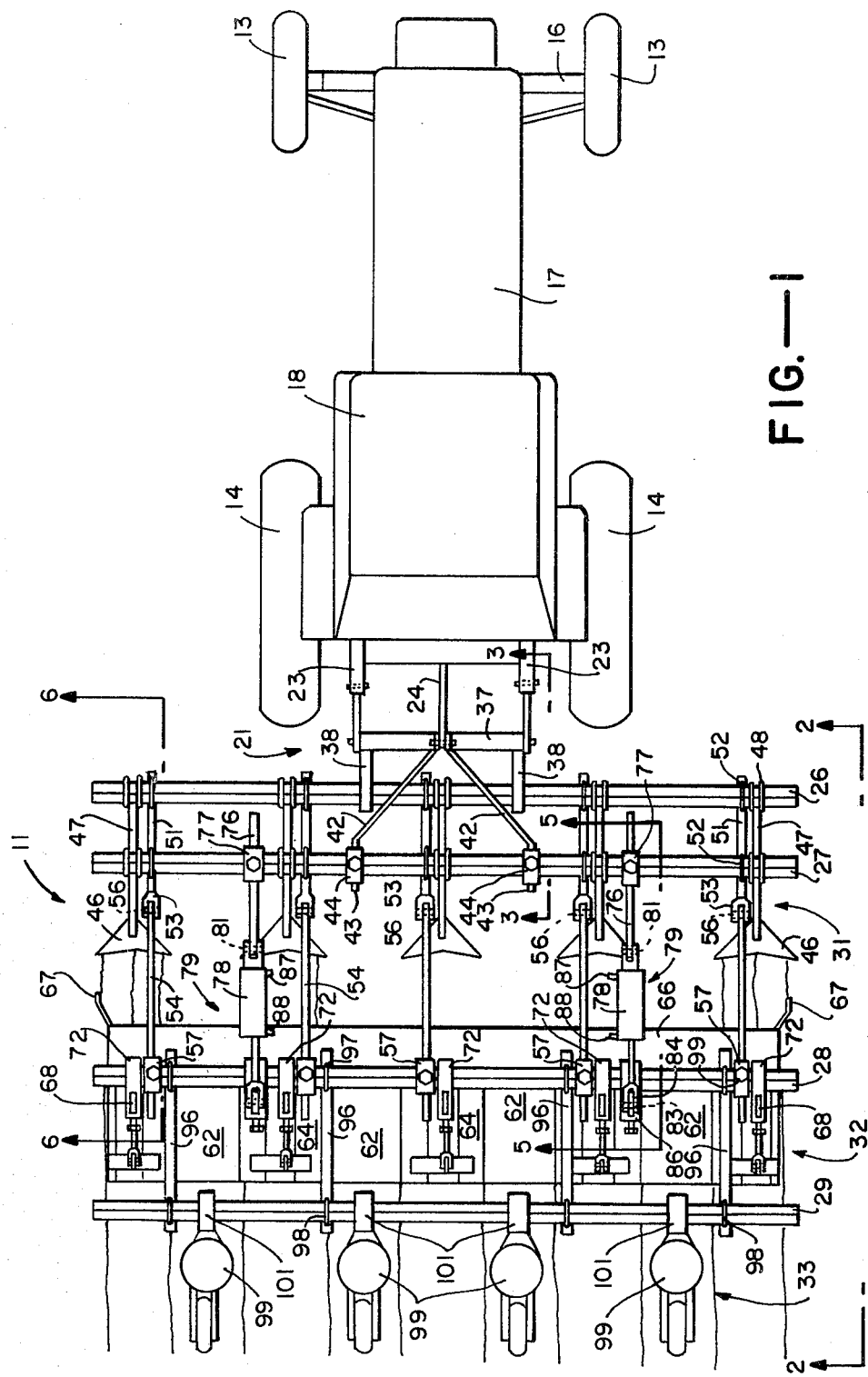
FIG.—1

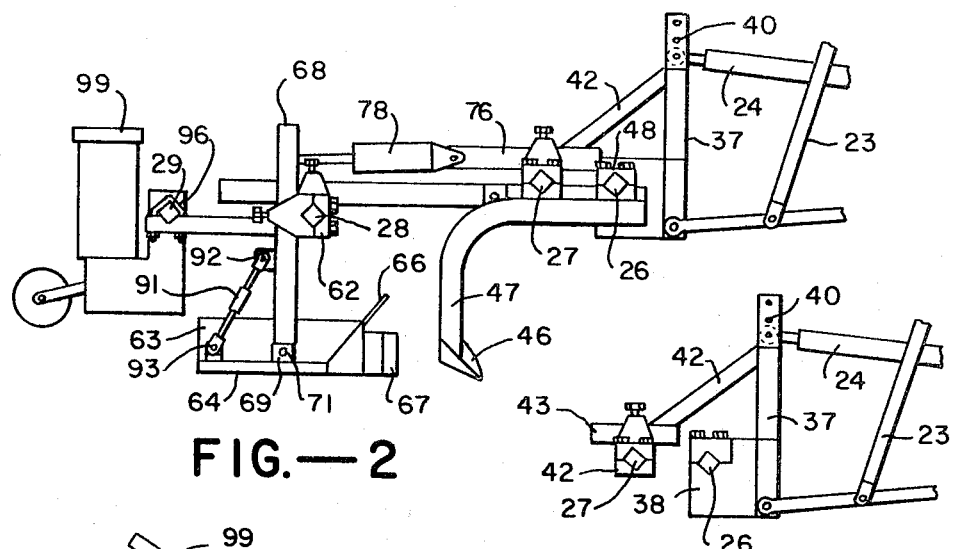
FIG.—2
FIG.—3
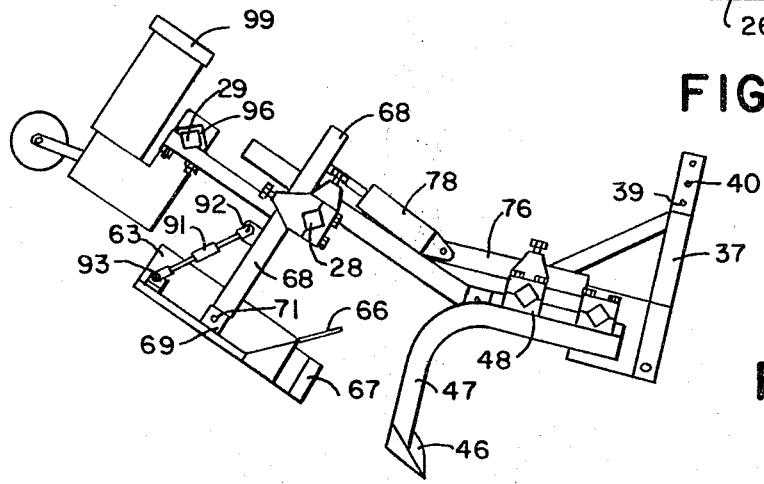
FIG.—4
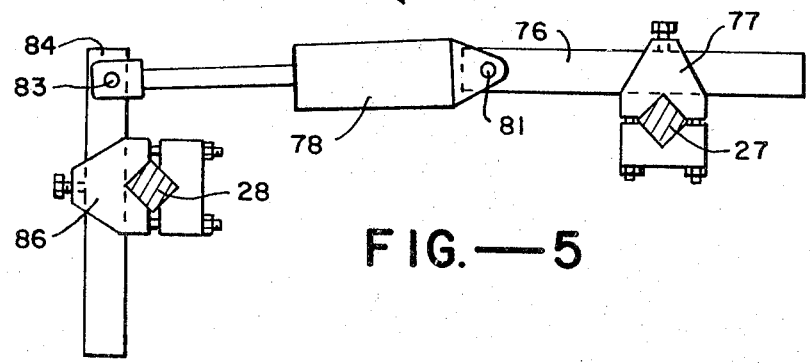
FIG.—5
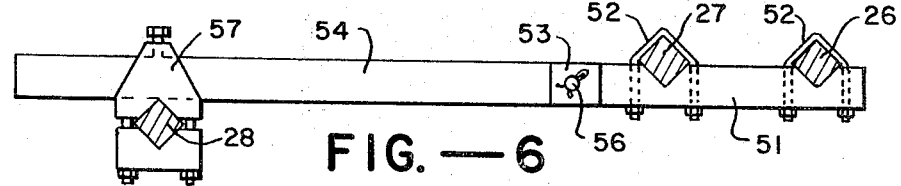
FIG.—6

LISTING AND BED SHAPING APPARATUS WITH PLANTER ATTACHMENT AND METHOD

This invention relates to agricultural apparatus and more particularly to a listing and bed shaping apparatus with a planter attachment and method.

Heretofore it has been the practice to pull listers behind tractors to form furrows and raised beds and to thereafter in a separate operation to more precisely form the beds with bed shaping apparatus to eliminate clods and to compact the soil. Ofentimes in connection with such a separate operation utilizing bed shaping apparatus, it has been the practice to attach planters to the bed shaping apparatus so that the planting operation can take place at the same time that the beds are shaped. A need has arisen to shape the raised beds as soon as they have been formed and also to plant the same.

In general, it is an object of the present invention to provide a listing and bed shaping apparatus with a planter attachment and a method.

Another object of the invention is to provide an apparatus of the above character which can be utilized with a three-point hitch.

Another object of the invention is to provide an apparatus of the above character in which the positions of the bed shapers can be adjusted relative to the positions of the lister bottoms.

Another object of the invention is to provide an apparatus of the above character in which the positions of the planters can be readily adjusted.

Another object of the invention is to provide a method of the above character in which the listing, shaping of the bed and planting can be accomplished in a single pass.

Other objects and features of the invention will appear from the following description in which the preferred embodiment is set forth in detail in conjunction with the accompanying drawings.

FIG. 1 is a top plan view of a listing and bed shaping apparatus with planter attachment incorporating the present invention and mounted upon a tractor.

FIG. 2 is a side elevational view looking along the line 2—2 of FIG. 1.

FIG. 3 is a cross-sectional view taken along the line 3—3 of FIG. 1.

FIG. 4 is a view similar to FIG. 2 but showing the bed shapings and planters in a raised position relative to the lister bottoms and showing the lister bottoms raised out of the ground.

FIG. 5 is a cross-sectional view taken along the line 5—5 of FIG. 1.

FIG. 6 is a cross-sectional view taken along the line 6—6 of FIG. 1.

In general the combination listing and bed shaping apparatus with a planter attachment is for use with a self-propelled vehicle having a three-point hitch. At least one tool bar is adapted to be secured to said hitch so that it extends in a generally horizontal direction. An additional tool bar is provided. Means is provided for securing said additional tool bar to said at least one tool bar so that said additional tool bar also extends in a generally horizontal direction parallel to said at least one tool bar and can be pivoted about a horizontal axis also parallel to said at least one tool bar. A plurality of spaced apart lister bottoms are carried by said at least one tool bar. A plurality of bed shapers are carried by said additional tool bar. Hydraulic actuators are provided for raising and lowering the additional tool bar with respect to said at least one tool bar. Planters are secured to the additional tool bar.

More particularly as shown in the drawings, the combination listing and bed shaping apparatus 11 with the planter attachments is adapted to be drawn by a suitable selfpropelled vehicle such as a wheeled tractor 12. The tractor is of a conventional type such as a series 986 tractor manufactured by the International Harvester Company and includes front and rear wheels 13 and 14 mounted upon a frame 16. A motor 17 is mounted upon the frame 16 as is a cab 18. Controls (not shown) of a conventional type are provided in the cab for operating the tractor 12 and also for operating the combination listing and bed shaping apparatus 11 as hereinafter described.

The tractor 12 is provided with a conventional three-point hitch 21. Such a conventional three-point hitch includes two spaced apart arms to which are pivotally connected two spaced apart arms 23. It also includes an arm or link 24 which is utilized for controlling the pitch of the apparatus secured to the three-point hitch.

The combination listing and bed shaping apparatus 11 which is secured to the three point hitch 21 consists of a plurality of tool bars 26, 27 28 and 29 which can be characterized as the first, second, third and fourth tool bars. At least one and preferably two of the tool bars, namely tool bars 26 and 27 are associated with the listing apparatus 31 whereas the third tool bar 28 is associated with the bed shaping apparatus 32 and the fourth tool bar 29 is associated with the planting apparatus 33.

The first and second tool bars 26 and 27 are secured to the three-point hitch 21 by an A-frame type construction 36 of a pair of members 37 that are spaced apart at their lower extremities and are secured to box-like members 38 which carry the tool bar 26. The members 37 extend upwardly and rearwardly with respect to the tool bar 26 and are connected at the top to form an inverted V. A pair of spaced apart ears 39 are secured to the tops of the members 37 and are provided with a plurality of vertically spaced holes 40. The arm 24 is pivotally connected to the ears 39 through one of the holes 40 by a pin 41. The A-Frame construction 36 also includes another pair of members 42 which arre secured to the upper part of the V formed by the members 37 by suitable means such as welding and extend downwardly and outwardly. They are secured by suitable means such as welding to horizontally extending bars 43. The bars 43 extend rearwardly into tool bar clamps 44 which are secured to the tool bar 27.

The listing apparatus 31 is secured to the tool bars 26 and 27. The listing apparatus consists of a plurality of lister bottoms 46. Each of the lister bottoms 46 is carried by a curved shank 47. The shanks 47 are secured to the tool bar 26 and 27 by suitable means such as clamps 48 which are secured to both of the tool bars 26 and 27.

A plurality of spacer bars 51 are secured to the tool bars 26 and 27 by clamps 52 and serve to space apart the tool bars 26 and 27 so that they extend substantially parallel to each other in a horizontal position. The spacer bars 51 extend rearwardly from the tool bars 26 and 27. Each of the spacer bars 51 has a pair of spaced apart ears 53 affixed thereto by suitable means such as welding. Rearwardly extending bars 54 are pivotally connected between the ears 53 by pins 56 which serve to provide a horizontal axis for pivotal movement of the bars 54. The rearwardly extending bars 54 extend into tool bar clamps 57 which are mounted upon the third bar 28. In this way, it can be seen that the third tool bar 28 is connected to the first and second tool bars 26 and 27.

The bed shaping apparatus 32 is connected to the third tool bar 28. The bed shaping apparatus 32 consists of an elongated sheet metal structure 61 which is formed so as to shape the beds which are formed by the listing apparatus 31. For this purpose, it is provided with a flat or planar upper wall 62, downwardly and outwardly inclined side walls 63 and bottom flat or planar walls 64. The sheet metal structure 61 also consists of an upwardly and forwardly extending top member 66 as well as outwardly and forwardly extending side members 67.

The sheet metal structure 61 is secured to the tool bar 28 by a plurality of upstanding bars or shanks 68. The shanks bars 68 are pivotally connected to ears 69 provided on the sheet metal structure by the use of pins 71. The bars 68 extend upwardly through tool bar clamps 72 which are secured to the tool bar 28. As can be seen the shanks 68 are adjustable vertically to properly position the bed shapers.

Means is provided for causing raising and lowering of the bed shaping apparatus relative to the listing apparatus 31 for pivotal movement about a horizontal axis formed by the pins 56 and consists of a pair of bars 76 which are adjustably positioned in tool bar clamps 77 mounted on the tool bar 27 and that extend rearwardly from the tool bar 27. A cylinder 78 of a hydraulic actuator 79 is pivotally connected by a pin 81 to the rearmost extremity of each bar 76. The piston 82 of the hydraulic actuator 79 is provided with a clevis 82 which is pivotally connected by a pin 83 to a vertically extending bar 84. The bar 84 is adjustably positioned in a tool bar clamp 86 mounted on the tool bar 28. The hydraulic actuators are provided with inlets and outlets 87 and 88 which are connected to hoses (not shown) that are connected to a hydraulic pump of a conventional (not shown) driven by the power takeoff of the tractor 12.

Additional means is provided for adjusting the sheet metal structure 61 relative to the tool bar 28 and consists of turnbuckles 91 which are pivotally connected to ears 92 mounted on the shanks 68 and ears 93 provided on the sheet metal structure 61. By adjustment of the turnbuckles 91, the bed shapers can be positioned so that they travel parallel to the surface of the ground formed by listing apparatus 31.

Means is provided for connecting the fourth tool bar 29 to the third tool bar 28 consists of elongate members 96 which are secured to the tool bar 28 by suitable means such as clamp assemblies 97. The members 96 extend rearwardly and are secured to the tool bar 29 by clamp assemblies 98. A plurality of conventional planter assemblies 99 are secured to the tool bar 29 at spaced intervals by clamp assemblies 101.

Operation and use of the combination listing and bed shaping apparatus with planter attachments in performing the method of the present invention may now be briefly described as follows. Let is now be assumed that it is desired to move the apparatus into the field. When this is the case, the three-point hitch 21 is operated by the tractor operator to lift the first and second tool bars 26 and 27 to their uppermost positions. In order to provide and necessary clearance, the bed shaping apparatus with the planting attachments can also be raised to their uppermost positions with respect to the listing apparatus by operation of the hydraulic actuators 79. After the equipment has been moved into the field and is ready for use, the lister bottoms 46 are lowered into the ground by operation of the three point hitch to lower the same. At the time of this lowering, the bed shaping apparatus 32 and the planting apparatus 33 are retained in their uppermost positions so as to permit the lister bottoms 46 to enter the ground. As soon as the lister bottoms 46 have entered the ground and are forming furrows to provide the raised beds, the hydraulic actuators 79 can be operated to lower the bed shaping apparatus 32 and the planting apparatus 33 so that they come into engagement with the ground. Normally, the bed shaping apparatus 32 is adjusted so that when the hydraulic actuators are fully extended, the bed shaping apparatus is traveling parallel to the ground. This can be readily accomplished by vertical adjustment of the shanks 68 in the tool bar clamps 72 and also be adjustment of th turnbuckles 91. The planting apparatus also can be readily adjusted so that it will plant when the bed shaping apparatus is in the appropriate position.

As the tractor is advanced in the field, the beds will be first formed by the listing apparatus 31. The bed shaping apparatus 32 eliminates the clods and forms a smooth bed for the seeding or planting apparatus. Beds so formed will be of the appropriate depth throughout their length and will be fully compacted. If desired, fertilizer attachments can be utilized in conjunction with the planting apparatus.

By adjusting the bed shaping apparatus 32 with respect to the listing apparatus 31 with the hydraulic actuators 79 in their fully extended positions, permits the operator to operate the hydraulic actuators at their extreme positions which makes it unnecessary for the operator to guess as to the depth the bed shaping apparatus is running relative to the listing apparatus.

When the end of the field is reached, the operator operates the three point hitch to raise the listing apparatus out of the ground. This in turn will raise the bed shaping apparatus 32 and the planting apparatus 33 out of the ground. The operator can then turn the tractor in the field and commence the formation of additional furrows and raised beds in the field by raising the bed shaping apparatus 32 and the planting apparatus 33 with respect to the listing apparatus by operation of the hydraulic actuators 79 to raise the same relative to the listing apparatus. The listing apparatus can then be lowered into the ground by operation of the three-point hitch and the tractor advanced to cause lister bottoms 46 to engage the ground and commence making furrows and raised beds. As soon as the lister bottoms 46 have penetrated to the desired depth, the hydraulic actuators 79 can be operated to again lower the bed shaping apparatus 32 and the planting apparatus 33 so that the bed shaping apparatus again travels parallel to the ground and performs the bed shaping functions hereinbefore described.

In this way, it can be seen that with a single travel through the field with the tractor, the beds can be formed with the listing apparatus. The beds are then shaped by the bed forming apparatus and are planted by the planting apparatus. In addition, if desired. fertilizer attachments can be added to the planters so that fertilizer can be applied at the time of planting. By using such a method, it can be seen that there is a substantial saving of fuel because of fewer required passes through the field. In addition, compacting of the ground is eliminated. Such compacting after listing would occur is a tractor entered the field in a separate operation to perform the bed shaping and planting operations. The provision of the bed shapers with the listing apparatus serves to stabilize the listing apparatus so as to inhibit lateral movement of the listing apparatus. This facilitates steering of the equipment along a selected path.

It is apparent from the foregoing that there has been provided a combination listing and bed shaping apparatus with planter attachments which greatly facilitates agricultural operations and at the same time promotes economy of fuel and less compaction of the soil.

What is claimed is:

1. In a combination listing and bed shaping apparatus for use with a self-propelled vehicle having a three-point hitch, first tool bar means, means for securing said first tool bar means to said three-point hitch so that said first tool bar means extends in a generally horizontal direction perpendicular to the path of travel of the self-propelled vehicle, listing apparatus carried by said first tool bar means for forming furrows and raised beds, a second tool bar, means for securing said second tool bar to said first tool bar means permitting pivotal movement of said second tool bar about an axis parallel to the first tool bar means, bed shaping apparatus carried by said second tool bar for forming the raised beds, said bed shaping apparatus comprising an elongate sheet metal structure having a generally planar upper wall and downwardly and outwardly inclined side walls, means connected between said first tool bar means and said second tool bar for raising and lowering said second tool bar with respect to said first tool bar means, a third tool bar secured to said second tool bar and planting apparatus secured to said third tool bar and adapted to plant seeds in the raised beds.

2. Apparatus as in claim 1 wherein said means for securing said bed shaping apparatus to said additional tool bars includes a plurality of shanks pivotally secured to said bed shaping apparatus and tool bar clamps for adjustably securing said shanks to said additional tool bar and means secured between said bed shaping apparatus and said additional tool bar for adjusting the angular position for said bed shaping apparatus.

3. Apparatus as in claim 2 wherein said means for adjusting the angular position of said bed shaping apparatus includes turnbuckle means.

4. Apparatus as in claim 1 wherein said means for causing raising and lowering of the additional tool bar with respect to the tool bar means includes a hydraulic actuator.

5. Apparatus as in claim 1 wherein said tool bar means includes first and second spaced apart parallel tool bars and wherein said listing apparatus includes lister bottoms, shanks connected to said lister bottoms, and tool bar clamps for securing said shanks to said first and second tool bars of said tool bar means.

6. Apparatus as in claim 5 together with means for adjusting the bed shaping apparatus so that it travels in a position parallel to the ground with the lister bottoms in bed forming positions.

* * * * *